3,218,355
HALOGENATED ADAMANTANE DERIVATIVES
Marvin Paulshock, Wilmington, Del., assignor to E. I.
du Pont de Nemours and Company, Wilmington, Del.,
a corporation of Delaware
No Drawing. Filed Oct. 28, 1964, Ser. No. 407,251
5 Claims. (Cl. 260—557)

This application is a continuation-in-part of my copending application Serial No. 157,260, filed December 5, 1961, which is now abandoned.

This invention relates to chemical compounds and more particularly to novel adamantane derivatives having outstanding properties.

Adamantane can also be identified as tricyclo-(3.3.1.1$^{3,7}$)decane. Its preparation is described in Ludwig U.S. Patent 2,937,211, issued May 17, 1960.

According to the present invention, a narrow class of adamantane derivatives is discovered to have extremely valuable properties. These compounds are particularly useful as chemical intermediates, anti-viral agents, and are particularly characterized by unexpectedly high insecticidal activity and unexpectedly low mammalian toxicity.

The halogenated adamantane compounds of this invention are represented by the following formula:

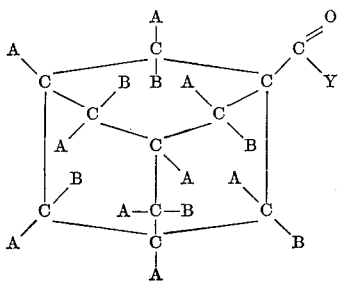

wherein

A and B are each hydrogen, chlorine, or fluorine;
Y is OH; Cl; NR$_1$R$_2$ where R$_1$ is hydrogen or alkyl of 1 through 4 carbons, R$_2$ is hydrogen, alkyl of 1 through 4 carbons, or methoxy; or the cyclic group

where Z is a divalent radical containing 4 through 6 atoms which are either all carbon atoms or carbon atoms in combination with oxygen or nitrogen;

with the proviso that the total number of chlorine and fluorine atoms for A and B on the compound be in the range of from 4 through 9.

Particularly preferred compounds are the carboxamide and substituted carboxamide derivatives within the scope of this invention. Illustrative of such compounds are octachloroadamantane - 1 - carboxamide, octachloro-N-methyladamantane - 1 - carboxamide, octachloro - N-ethyladamantane-1-carboxamide, octachloro - N,N - dimethyladamantane-1-carboxamide, and octachloro-N,N-diethyladamantane-1-carboxamide.

Halogenated adamantanes within this invention having from 6 through 9 halogen atoms, in particular chlorine atoms, and especially those having carboxamide substituents, are particularly advantageous in that they exhibit outstanding solubility characteristics.

It will be readily understood by persons skilled in the art that the orientation of the halogen atoms within the adamantane structure may be difficult to determine, but the particular position of the halogen atoms is not critical for the usefulness herein recited.

The compounds of this invention are solids and can be prepared by a variety of methods, as will be more fully understood by reference to the following illustrative examples. In the examples, the specified parts are parts by weight unless otherwise indicated.

EXAMPLE 1

A reaction vessel is equipped with a stirrer, a condenser topped with a calcium chloride drying tube, and a source of UV irradiation. A mixture of 180 parts of adamantane-1-carboxylic acid and 3000 parts of carbon tetrachloride is treated with gaseous chlorine with stirring under UV irradiation until chlorine is no longer absorbed by the medium at 50–60° C. Then the mixture is stripped under reduced pressure to give a residue of crude octachloroadamantane-1-carboxylic acid. The acid is purified, if desired, by extraction with aqueous sodium hydroxide and precipitation with mineral acid.

Carboxamide derivatives of the chlorinated adamantane carboxylic acids, such as octachloroadamantane-1-carboxylic acid obtained in Example 1 can be obtained by first converting the acid to the corresponding acid chloride and then reacting the acid chloride with an amine or with ammonia. This conversion of an acid to a carboxamide is illustrated below:

EXAMPLE 2

A mixture of 45.6 parts of octachloroadamantane-1-carboxylic acid and 100 parts of thionyl chloride is heated under reflux for 1 hour. The excess thionyl chloride is removed under reduced pressure to give a residue of essentially pure octachloroadamantane-1-carboxylic acid chloride.

The acid chloride thus produced is dissolved in ether and gaseous methylamine is conducted into the solution until at least 6.2 parts of the methylamine are absorbed, whereupon a mildly exothermic reaction occurs along with the precipitation of methylamine hydrochloride. The mixture is washed twice with water, once with 1% sodium hydroxide, again with water, once with 1% hydrochloric acid, and finally with water. The resulting ether layer is thoroughly stripped under greatly reduced pressure to give octachloro-N - methyladamantane - 1 - carboxamide. The substitution of ammonia for methylamine in the foregoing reaction gives octachloroadamantane-1-carboxamide as the product.

EXAMPLE 3

Octachloroadamantane-1-carboxylic acid chloride, synthesized as in Example 2, is an excellent chemical intermediate for the synthesis of various octachloroadamantane-1-amides. Typical procedures are described as follows:

Method A

The acid chloride (0.1 mole) in ether is added to the reactant amines, 0.2 mole, in ether. After stirring for one hour at 20–50° C., the mixture is washed with water, dried and stripped to give essentially pure amide.

Method B

The acid chloride (0.1 mole) in ether is added to a mixture of the reactant (0.1 mole) and anhydrous triethylamine (0.1 mole) in ether. The amide is isolated as in Method A.

The following table lists representative and exemplary compounds of this invention synthesized according to the indicated method from 45.6 parts by weight of octachloroadamantane-1-carboxylic acid chloride.

| Example | Reactant | Method | Product |
|---|---|---|---|
| 4 | Ammonia, 3.4 parts | A | Octachloroadamantane-1-carboxamide. |
| 5 | Dimethylamine, 9.0 parts. | A | N,N-dimethyloctachloroadamantane-1-carboxamide. |
| 6 | O-methylhydroxylamine, 4.8 parts. | B | N-methoxyoctachloroadamantane-1-carboxamide. |
| 7 | Tert-butylamine, 14.6 parts. | A | N-tert-butyloctachloroadamantane-1-carboxamide. |
| 8 | Diisopropylamine, 20.2 parts. | A | N,N-diisopropyloctachloroadamantane-1-carboxamide. |
| 9 | N-methylbutylamine, 17.4 parts. | A | N-butyl-N-methyloctachloroadamantane-1-carboxamide. |
| 10 | N,O-dimethylhydroxylamine, 6.1 parts. | B | N-methoxy-N-methyloctachloroadamantane-1-carboxamide. |
| 11 | Morpholine, 17.4 parts | A | Morpholinooctachloro-1-adamantyl ketone. |
| 12 | Piperidine, 17.0 parts | A | Piperidinooctachloro-1-adamantyl ketone. |
| 13 | Imidazolidine, 14.4 parts. | A | Imidazolidinyl octachloro-1-adamantyl ketone. |

A further example of the chlorination of adamantane carboxylic acid is given in the following example.

EXAMPLE 14

A mixture of 180 parts of adamantane-1-carboxylic acid and 1500 parts of carbon tetrachloride is rapidly stirred and subjected to UV irradiation while 484 parts of chlorine is conducted into the solution. The hydrogen chloride escapes through a calcium chloride tube. The stirring and UV irradiation is continued for one-half hour followed by thorough removal of the solvent under reduced pressure. The residual solid is dissolved in aqueous alkali and is precipitated with mineral acid to give essentially pure tetrachloroadamantane-1-carboxylic acid.

Fluoroadamantane carboxylic acids can be synthesized by a halogen interchange method as illustrated by the following example.

EXAMPLE 15

A mixture of 4.56 parts of octachloroadamantane-1-carboxylic acid, 21.6 parts of antimony pentafluoride and 50 parts of perfluorocyclohexane is heated for 2 hours at 100° C. in a polytetrafluoroethylene-lined autoclave. After cooling and careful opening of the autoclave, the mixture is filtered and the perfluorocyclohexane is removed by evaporation at reduced pressure. The residue is washed with dilute hydrochloric acid, washed with water, and dried to give essentially pure octafluoroadamantane-1-carboxylic acid.

The carboxamide derivatives of the fluoroadamantane carboxylic acids, such as octafluoroadamantane-1-carboxylic acid obtained in Example 15 above can be readily obtained by converting the acid to the corresponding acid chloride and then reacting the acid chloride with an amine or with ammonia as shown hereinabove in Examples 2–13 for the preparation of carboxamide derivatives of chloroadamantane carboxylic acids.

The above and similar examples can be carried out in accordance with the teachings of this invention, as will be readily understood by persons skilled in the art, by substitution of reactants in indicated amounts in place of those specified. Thus, the foregoing detailed description has been given for clearness of understanding only and no unnecessary limitations are to be understood therefrom.

I claim:
1. A compound of the formula

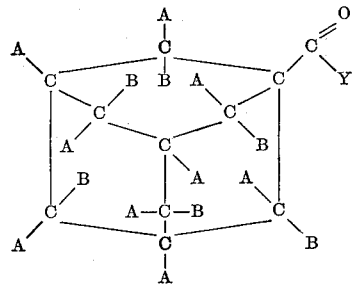

wherein
  A and B are each selected from the group consisting of hydrogen, chlorine, and fluorine;
  Y is selected from the group consisting of OH; Cl; $NR_1R_2$ where $R_1$ is selected from the group consisting of hydrogen and alkyl of 1 through 4 carbons, $R_2$ is selected from the group consisting of hydrogen, alkyl of 1 through 4 carbons, and methoxy; and the cyclic group

where Z is a divalent radical of 4 through 6 atoms which only other than carbon atoms can contain a hetero atom selected from the group consisting of oxygen and nitrogen;
with the proviso that the total number of chlorine and fluorine atoms and A and B on said compound be in the range of from 4 through 9.

2. Octachloroadamantane-1-carboxamide.
3. Octachloro-N-methyladamantane-1-carboxamide.
4. Octachloro-N-ethyladamantane-1-carboxamide.
5. Octachloro - N,N - dimethyladamantane - 1-carboxamide.

No references cited.

WALTER A. MODANCE, *Primary Examiner.*